US 11,172,646 B2

(12) United States Patent
Van Den Berg et al.

(10) Patent No.: US 11,172,646 B2
(45) Date of Patent: Nov. 16, 2021

(54) SYSTEM AND METHOD TO CARRY OUT A FLOOR RELATED ACTION

(71) Applicant: Lely Patent N.V., Maassluis (NL)

(72) Inventors: Karel Van Den Berg, Maassluis (NL); Dik-Jan Wisse, Maassluis (NL)

(73) Assignee: Lely Patent N.V., Maassluis (NL)

( * ) Notice: Subject to any disclaimer, the term of this patent is extended or adjusted under 35 U.S.C. 154(b) by 779 days.

(21) Appl. No.: 15/565,766

(22) PCT Filed: Apr. 12, 2016

(86) PCT No.: PCT/NL2016/050253
§ 371 (c)(1),
(2) Date: Oct. 11, 2017

(87) PCT Pub. No.: WO2016/167649
PCT Pub. Date: Oct. 20, 2016

(65) Prior Publication Data
US 2018/0116166 A1    May 3, 2018

(30) Foreign Application Priority Data
Apr. 13, 2015 (NL) ...................... 2014622

(51) Int. Cl.
A01K 1/01       (2006.01)
A01K 5/02       (2006.01)
(Continued)

(52) U.S. Cl.
CPC .......... A01K 1/0128 (2013.01); A01K 1/015 (2013.01); A01K 1/0151 (2013.01); A01K 1/10 (2013.01);
(Continued)

(58) Field of Classification Search
CPC . A01K 1/01; A01K 1/10; A01K 1/105; A01K 5/00; A01K 5/001; A01K 5/02;
(Continued)

(56) References Cited
U.S. PATENT DOCUMENTS 5,652,489 A * 7/1997 Kawakami ........... G05D 1/0242
318/568.12
8,224,516 B2 * 7/2012 Anderson ............ G05D 1/0274
701/23

(Continued)

FOREIGN PATENT DOCUMENTS
EP       2 169 501 A1    3/2010
WO   2013/157928 A1    10/2013
(Continued)

OTHER PUBLICATIONS

International Search Report dated Jul. 20, 2016 in PCT/NL2016/050253 filed Apr. 12, 2016.

Primary Examiner — Ebony E Evans
(74) Attorney, Agent, or Firm — Oblon, McClelland, Maier & Neustadt, L.L.P.

(57) ABSTRACT

The invention relates to a system to carry out a floor related action. The system comprises an animal enclosure for detaining at least one animal and provided with an enclosure floor surface, a first autonomous vehicle configured to navigate over the floor surface to carry out the floor related action, and a feed providing device to provide feed to the animal. The system comprises a communication signal configured to transmit a communication signal representative for an actual or planned feeding action of the feed providing device to the first vehicle, which action influences the position of animals with the animal enclosure. In order to move the first vehicle more efficiently over the stable floor, in particular to avoid interference with animals on the stable (Continued)

floor, the first vehicle is capable to adapt its navigation based on the communication signal representative for the actual or planned feeding action.

22 Claims, 1 Drawing Sheet

(51) Int. Cl.
G05D 1/02 (2020.01)
A01K 1/10 (2006.01)
A01K 1/015 (2006.01)

(52) U.S. Cl.
CPC .............. A01K 1/105 (2013.01); A01K 5/02 (2013.01); G05D 1/028 (2013.01); G05D 2201/0203 (2013.01)

(58) Field of Classification Search
CPC ...... A01K 29/00; A01K 1/015; A01K 1/0151; A01K 1/0128; A01K 1/0132; A01K 1/0146; G05D 1/028; G05D 2201/0203
USPC ..................................................... 119/57.92
See application file for complete search history.

(56) References Cited

U.S. PATENT DOCUMENTS

| | | | |
|---|---|---|---|
| 8,316,799 B2* | 11/2012 | Van Den Berg | A01K 9/00 119/14.18 |
| 9,031,732 B1* | 5/2015 | Cudak | G05D 1/028 701/23 |
| 9,265,230 B2* | 2/2016 | Van Aalst | A01K 3/005 |
| 9,377,521 B2* | 6/2016 | Li | G05D 1/0016 |
| 10,244,736 B2* | 4/2019 | Song | A01K 29/005 |
| 2002/0133899 A1* | 9/2002 | Van den Berg | A01K 1/01 15/319 |
| 2005/0171644 A1* | 8/2005 | Tani | G05D 1/0274 700/253 |
| 2010/0076641 A1 | 3/2010 | Van Den Berg | |
| 2010/0326363 A1* | 12/2010 | Van Den Berg | A01K 1/105 119/57.92 |
| 2014/0034750 A1* | 2/2014 | Van Kuilenburg | A01K 1/105 239/71 |
| 2014/0136414 A1* | 5/2014 | Abhyanker | G06Q 10/087 705/44 |
| 2015/0034014 A1* | 2/2015 | Van Kuilenburg | A01K 5/02 119/51.01 |
| 2015/0073638 A1* | 3/2015 | Van Kuilenburg | G08G 1/20 701/22 |
| 2015/0075436 A1 | 3/2015 | Wisse et al. | |
| 2015/0149050 A1* | 5/2015 | Palsgaard | G05D 1/0221 701/50 |
| 2015/0223427 A1 | 8/2015 | Agayev et al. | |
| 2016/0249585 A1* | 9/2016 | Van Den Berg | A01K 5/0275 119/51.02 |
| 2017/0094897 A1* | 4/2017 | Balutis | G05D 1/028 |
| 2017/0231187 A1* | 8/2017 | Van Den Beukel | A01K 27/009 119/14.08 |
| 2017/0325422 A1* | 11/2017 | Van Den Berg | A01K 5/0107 |
| 2019/0246600 A1* | 8/2019 | Buijs | A01K 5/0266 |

FOREIGN PATENT DOCUMENTS

| | | | | |
|---|---|---|---|---|
| WO | 2014/021712 A1 | 2/2014 | | |
| WO | WO-2016153408 A1 * | 9/2016 | .......... | G05D 1/0088 |

* cited by examiner

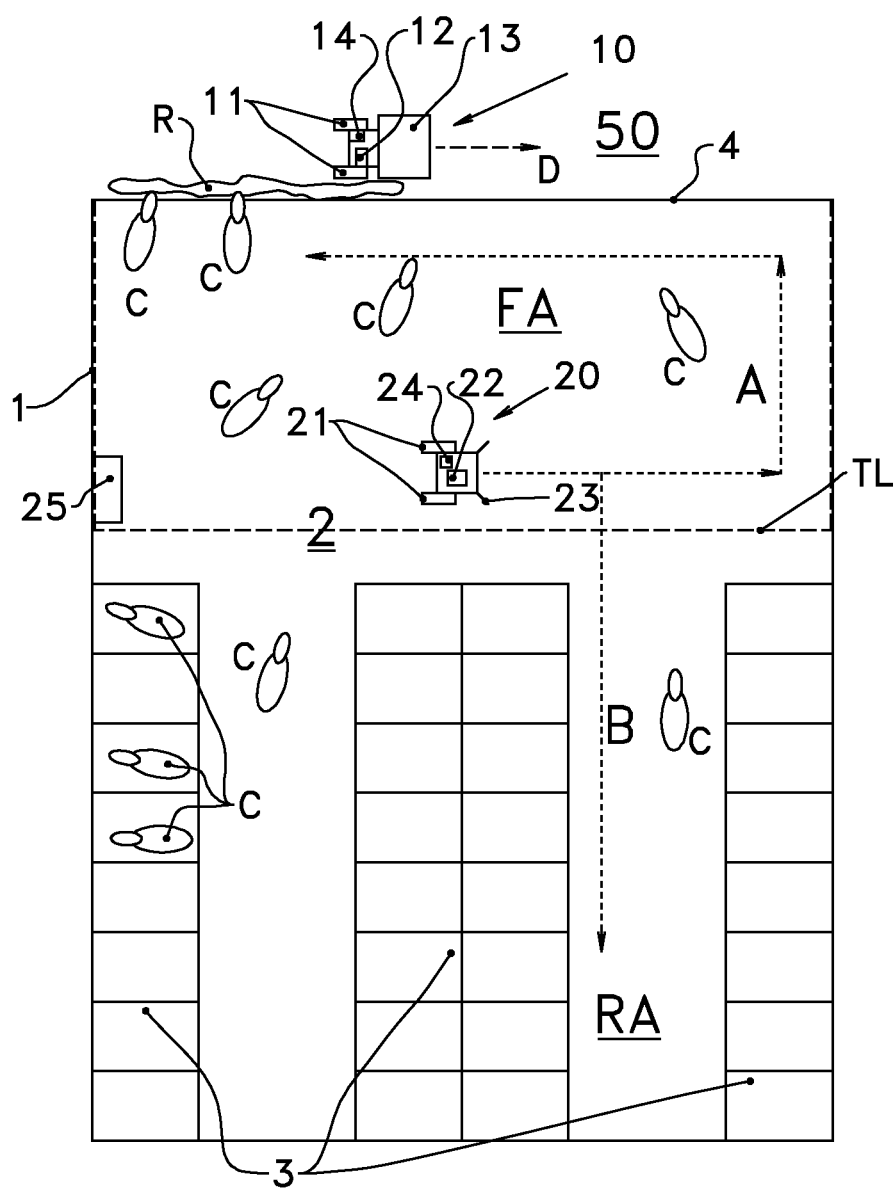

SYSTEM AND METHOD TO CARRY OUT A FLOOR RELATED ACTION

1. FIELD

The present invention relates to a system and method to carry out a first stable floor related action, in particular a floor cleaning action.

2. BACKGROUND

It is known to use unmanned vehicles to carry out floor related actions. These unmanned vehicles may autonomously move over the stable floor to carry out these actions.

For example, unmanned autonomous vehicles may be used to clean the stable floor by scraping a scraper device over the stable floor to displace manure to one or more floor openings provided in the stable floor through which the manure may be discharged into a collection chamber provided below the stable floor. It is also known to use unmanned autonomous vehicles to transfer manure from a higher stable floor surface, typically a floor surface of a resting box, to a lower stable floor surface. In such embodiment, also a scraping device may be used.

Another type of unmanned vehicle to carry out a stable floor action, in particular for cleaning the stable floor, is a manure collection vehicle that comprises a manure collection chamber and a suction device to suck manure into the collection chamber while driving over the stable floor surface.

It is desirable that the movement of unmanned vehicles over the stable floor is carried out efficiently. For this reason, the unmanned vehicles may be configured to navigate along a planned route. The route may be programmed into the unmanned vehicle such that the unmanned vehicle can move over the stable floor to efficiently carry out its task, for instance cleaning of the stable floor. In an alternative embodiment, the unmanned vehicle may be configured to navigate in a planned area. In such embodiment, the vehicle may be provided with a map of the stable floor in which areas are designated as specific areas to clean, such as e.g. a feeding area or a resting area.

However, since the location of animals on the stable floor is unknown and changing due to movements of the animals, the location of the animals cannot easily be taken into account during planning of the navigation of the unmanned vehicle. Therefore, it may be possible that the presence of animals on the stable floor may prevent or hinder the unmanned vehicle to be able to follow the desired route. For example, when an animal is standing in or lying on the planned route, the unmanned vehicle will not be able to directly follow this route.

In a known embodiment of an unmanned vehicle, the unmanned vehicle is provided with a sensor to detect the presence of animals on the route. In case an animal is detected by the sensor, for example a contact sensor, the unmanned vehicle may temporarily leave its route to pass the animal. However, such rerouting may have a negative effect on the efficiency of the task carried out by the unmanned vehicle.

For example, when the unmanned vehicle is used for cleaning the stable floor by scraping a scraping device over the stable floor, rerouting the unmanned vehicle to pass an animal may cause a part of the stable floor not being cleaned. This requires the unmanned vehicle to return to the location of the animal to check whether the animal is still there, and to clean this part of the stable floor in case the animal is no longer in this location. Also, the rerouting may require the unmanned vehicle to move in an opposite, backwards direction, which may result in a relatively large quantity of manure collected by the scraper device being left on the stable floor.

Alternatively, the vehicle may be programmed to wait until the detected animal moves away, which of course negatively influences the cleaning efficiency because it will take longer to finish a cleaning task. According to yet another alternative protocol the vehicle may have been programmed to carefully push the animal to move out of the way.

3. OBJECTIVES

An aim of the present invention is to provide a system to carry out a floor related action on a stable floor using a first autonomous vehicle, wherein the movements of the first autonomous vehicle over the stable floor can be performed efficiently.

4. SUMMARY

The invention provides a system to carry out a floor related action, the system comprising:
- an animal enclosure for detaining at least one animal and provided with an enclosure floor surface,
- a first vehicle to carry out the floor related action, wherein the first vehicle is configured to autonomously navigate along at least one planned route over the enclosure floor surface or is configured to autonomously navigate within at least one planned area of the enclosure floor surface, and
- a feed providing device to provide feed to the animal, characterized in that the system comprises a first communication device configured to transmit a communication signal representative for an actual or planned feeding action of the feed providing device, the first vehicle comprises a second communication device configured to receive the communication signal representative for the actual or planned feeding action, and the first vehicle is capable to adapt the planned route or planned area on the basis of the communication signal representative for the actual or planned feeding action.

The invention is based on the insight that feeding related actions may influence the location of the animals within the animal enclosure. By taking these actions into account, and their effect on the actual locations of the animals, a more efficient navigation of the unmanned vehicle can be planned, e.g. a route can be selected on which it is less likely that the unmanned vehicle will be hindered by the presence of one or more animals.

For example, when feed is provided to animals by a feed providing device, it is likely that a large part of the animals will go to a feeding area of the stable where the feed is provided to the animals. As a result, the information that the animals are fed or will be fed by the feed providing device can be regarded as relevant data relating to actual or expected locations of animals on the stable floor. When this information is provided to the first vehicle for carrying out floor related actions, for example a cleaning vehicle, the first vehicle can adapt its navigation to move to an area where less animals are expected, e.g. outside the feeding area, for example in a resting area of the stable. By moving the first vehicle to clean outside the feeding area, this vehicle will be less hindered by animals on its route, and the stable floor can be cleaned more efficiently.

The information of an actual or planned action to feed the animals, can be provided by the system based on input of a user, e.g. the system may be provided with a communication device by which the user can send the communication signal representative for an actual or planned action of providing feed to the animals. Or, in case an autonomous feed providing device is used, a communication device arranged on the feed providing device may be configured to transmit the communication signal representative for an actual or planned feeding action to the first vehicle.

It is remarked that although the system improves the efficiency of the unmanned vehicle, it cannot prevent that some animals may still be present on its route. In case the unmanned vehicle would still encounter animals on the route, it can be programmed, in the known manner to use its animal presence detector to detect those animals and either circumvent the animal, or wait until it has moved away or push the animal aside.

A stable for animals usually comprises an animal enclosure for detaining at least one animal. The enclosure is formed by enclosure elements, for example fences, gates, walls or combinations thereof. The enclosure elements may be arranged at fixed positions, but may also be movable, in order to change the size or shape of the animal enclosure. At least within the animal enclosure an enclosure floor surface is provided over which the animals may move.

Outside the animal enclosure a surface may be provided which may be part of the stable floor, and which is used to provide feed to the animals. Such surface outside the animal enclosure may for example be a feed alley which runs next to the animal enclosure. The feed alley can be used to move vehicles along a side of the animal enclosure in order to provide feed in or next to the animal enclosure. In such a stable the enclosure is typically provided with a feed fence which prevents the animal from leaving the enclosure and at the same time allows the animals to move with their heads outside the enclosure and eat feed presented to them in the feed alley.

Alternatively, the feed can be provided in feeding troughs in- or outside the animal enclosure. Further, alternatively the feed can be provided in a so-called feeder unit which is placed inside the animal enclosure. Note that the feed in the feeder unit is readily accessible to all animals present in the animal enclosure. This means that no prior identification of an animal is necessary in order to make the feed accessible. Also more than one animal can eat feed from the feeder unit at the same time.

The feed providing device may also be a device which can push feed already provided in the feeding alley towards the animals, or a device which can transport feed to the feeding alley and deposit it near the feed fence, or a device which can fill the feeding troughs or feeding units. The feed providing device may be provided as unmanned vehicle.

The unmanned vehicles may comprise one or more wheels to move the vehicle over a floor surface, and a driving device configured to actuate the one or more wheels in order to move the vehicle along a desired route. The route may be programmed in the driving device.

In an embodiment, the first vehicle is configured to clean the enclosure floor surface. The first vehicle may for example be a vehicle including a manure scraping device or a manure collection device. The vehicle may clean the enclosure floor surface by moving over the floor surface, or may be configured to carry out cleaning actions at specific locations of the enclosure floor surface.

In an embodiment, the first communication device is provided on the feed providing device. In such embodiment, the communication signal representative for the actual or planned feeding action can directly be transmitted from the feed providing device, in particular when the feed providing device is an autonomous vehicle configured to automatically perform its feeding tasks.

As an alternative, the communication signal may be transmitted by a first communication device of a handheld device of the farmer, or a stable monitoring system in which information on the feeding of the animal by the feed providing device is available. The communication signal may be sent automatically, but also by activation by a user, for example a farmer.

The first communication device and the second communication device may be wireless communication devices, such as Wi-Fi or Bluetooth devices.

The communication between the first and second communication device may be carried out after a specific communication connection has been established, but as an alternative, the first communication device may be configured to emit the communication signal without such communication connection, and the second communication device may receive the communication signal without confirmation of receipt of this signal to the first communication device.

The invention also provides a method of carrying out at least a stable floor related action on a stable floor surface, the method comprising the steps of:
  providing a first vehicle for carrying out the first stable floor related action, wherein the first vehicle is an unmanned vehicle configured to autonomously navigate along at least one planned route over the stable floor surface or is configured to autonomously navigate within at least one planned area of the stable floor surface, and
  providing a feed providing device configured to provide feed to one or more animals,
characterized by
  transmitting, by a first communication device, a communication signal representative for an actual or planned feeding action of the feed providing device,
  receiving the communication signal representative for the actual or planned feeding action by a second communication device provided on the first vehicle, and
  adapting the planned route or planned area of the first vehicle on the basis of the communication signal representative for the actual or planned feeding action.

Further embodiments of the method are described in claims 11-15.

5. BRIEF DESCRIPTION OF THE DRAWINGS

Further advantages and characteristics of the invention will now be elucidated by description of an embodiment of the invention, whereby reference is made to the accompanying drawing, in which:

FIG. 1 shows schematically a top view of a stable floor surface including an embodiment of a system according to the invention.

6. DETAILED DESCRIPTION

FIG. 1 shows schematically a top view of an animal stable comprising an animal enclosure 1 formed by fences, walls and/or gates. The animal enclosure 1 is configured to detain animals C, in particular cows, and comprises an animal enclosure floor surface 2 over which the animals C may freely move.

The enclosure floor surface 2 comprises at least two areas, a feeding area FA and a resting area RA. In FIG. 1 the transition between the feeding area FA and the resting area RA is schematically indicated by a dashed line TL.

The feeding area FA is arranged next to a feed alley 50 where food can be provided to feed the animals C. A feed fence 4 is provided at the side of the feed alley 50, which feed fence 4 allows the animals C to eat roughage R that is provided in the feed alley 50 next to the animal enclosure 1.

In the resting area RA resting boxes 3 are provided. The animals C may lie down in these resting boxes 3 when desired.

In the feed alley 50, an autonomous feed providing vehicle 10 is present to deliver roughage R next to the feed fence 4 so that the roughage R can be eaten by the animals C. The feed providing vehicle 10 comprises wheels 11, a driving device 12 to navigate the feed providing vehicle 10 along a planned route and a container 13 containing roughage R to be fed to the animals C. In order to provide roughage R to the animals C, the feed providing vehicle 10 navigates in direction D along the feed fence 4 and dispenses roughage R from the container 13 to a location along the feed fence 4, as shown in FIG. 1.

The dispensing of roughage R from the container may be carried out in any suitable way, for example by a dosing device or a robot arm. When the container 13 is depleted, the feed providing vehicle 10 may navigate to a roughage storage (not shown) where the container 13 may be re-filled with roughage R. Instead of roughage R, also any other feed may be provided by the feed providing vehicle 10, when desired.

The feed providing vehicle 10 further comprises a first wireless communication device 14 configured to transmit a communication signal when the feeding of the animals C is started and/or is finished. The communication signal may also indicate a planned starting or finishing of the feeding.

Within the animal enclosure 1, a floor cleaning vehicle 20 is provided. The floor cleaning vehicle 20 is an autonomous vehicle comprising wheels 21 and a driving device 22 configured to navigate the floor cleaning vehicle 20 over the enclosure floor surface 2. At the front of the floor cleaning vehicle 20, a scraper device 23 is provided which is scraped over the enclosure floor surface 2 to collect manure and/or move the manure to floor openings provided in the enclosure floor surface 2. Manure that falls through these floor openings will enter a manure collection container provided under the enclosure floor surface 2.

The floor cleaning vehicle 20 further comprises a second wireless communication device 24 configured to receive a communication signal transmitted by the first communication device 14 of the feed providing vehicle 10. This communication between the first communication device 14 and the second communication device 24 may for example be based on Wi-Fi or Bluetooth.

The floor cleaning vehicle 20 may return to a base station 25, for example charging a battery of the floor cleaning vehicle 20.

In an embodiment, the communication signal is transmitted after that a wireless communication connection has been established between the first communication device 14 and the second communication device 24. In an alternative embodiment, the first communication device can emit a communication signal, and the second communication device 24 can receive the communication signal without a specific communication connection being established between the first communication device 14 and the second communication device 24.

The driving device 22 is configured to autonomously navigate the floor cleaning vehicle 20 along at least one planned route over the enclosure floor surface 2. This route is determined on the basis of the cleaning requirements of the enclosure floor surface 2 and can be pre-programmed in the driving device 22. An example of such predetermined route is partly indicated by arrows A in FIG. 1. Normally, the floor cleaning vehicle 20 will move along this route A in order to clean the enclosure floor surface 2.

It may happen that an animal C is present on the route A. When the floor cleaning vehicle 20 determines that it cannot follow the route due to the presence of an animal, it may adapt its route to bypass the animal C and/or wait until the animal C moves from the route A so that the movement along the route can be continued. However, this bypassing or waiting slows down the movement of the floor cleaning vehicle 20 over the enclosure floor surface 2.

According to the present, the chance of the presence of animals on the route of the floor cleaning vehicle is decreased by communicating the actual or planned action of the feed providing vehicle 10 to the floor cleaning vehicle 20, and taking this information into account in planning of a route of the floor cleaning vehicle 20.

When feed, for example roughage R, is provided to the animals C, the animals C will move towards the feeding area FA in order to eat the feed provided by the feed providing vehicle 10. This means that when feed is provided to the animals C a relatively large quantity of animals C will be present in the feeding area FA, while a relatively small quantity of animals C will be present in the resting area.

To transfer this information to the floor cleaning vehicle 20, the feed providing vehicle 10 is configured to transmit, by the first communication device 14, a communication signal representative for an actual or planned action of the feed providing vehicle, in particular the start and/or finish of feeding of the animals C at the feed fence 4.

This communication signal is received by the second communication device 24. The driving device 22 of the floor cleaning vehicle 20 may process this communication signal and determine whether the planned route is planned through an area in which a relatively large quantity of animals C is expected.

In the example shown in FIG. 1, the planned route A runs through the feeding area FA, in which many animals C can be expected since roughage R is provided to the animals at feed fence 4. In order to avoid, or at least decrease, interference between the route of the floor cleaning vehicle 20 and the animals C, the driving device 22 re-plans the route to be followed by the floor cleaning vehicle 20 to an area in which less animals C are to be expected.

Since many animals will go to the feeding area FA to eat, the route is re-planned to the resting area RA where the cleaning of the enclosure floor surface 2 will be less hindered by the animals C. This re-planned route is indicated by route B.

By re-planning the route from route A to route B, the chance that the floor cleaning vehicle 20 will encounter an animal C is substantially reduced. However, it still is possible that an animal C will be present on the re-planned route B of the floor cleaning vehicle 20. In that case, the animal C can be passed in a known manner.

Hereinabove, an embodiment of a system according to the invention is described which uses information of a feed providing vehicle 10 to more efficiently clean the enclosure floor surface 2 of a stable floor.

In alternative embodiments of the system, the feed providing vehicle 10 may be any other type of device to provide feed to the animals, such as a feed pusher. The feed providing vehicle may be a vehicle that moves outside the animal enclosure, such as in the feed alley 50, but also within the animal enclosure 1.

In alternative embodiments of the floor cleaning vehicle 20, the floor cleaning vehicle 20 may not have a scraper device 23 configured to push manure to floor openings in order to discharge the manure in the manure collection container. For example, the floor cleaning vehicle may have a manure collection chamber itself into which manure is sucked in order to clean the enclosure floor surface 2. Also, a scraping device may be provided to move manure from a higher stable surface, for example a resting box surface, to a lower stable surface.

Furthermore, the system of the invention may also comprise another type of autonomous vehicle to carry out a floor related action within the animal enclosure. For example, autonomous vehicles are used to distribute saw dust in the resting boxes 3. Also, the routes of these vehicles may be adapted on the basis of a communication signal of a feed providing vehicle, such that the route of these vehicles may be planned in an area where a relatively small quantity of animals may be expected.

In the embodiment, described above, the navigation of the floor cleaning vehicle 20 is based on re-routing a planned route of the floor cleaning vehicle 20. In an alternative embodiment, the navigation of the floor cleaning vehicle 20 is not based on planning a route to be followed by the floor cleaning vehicle 20, but on a specific area designated to the floor cleaning vehicle 20 in which area the floor cleaning vehicle 20 may autonomously move to clean the enclosure floor surface, for example by random or semi random movements within the designated area.

When in such embodiment, the floor cleaning vehicle 20 receives a communication signal of the feed providing vehicle 10 indicating that the animal are fed or to be fed at feed fence 4, the driving device 22 can determine whether the designated area to be cleaned is within the feeding area FA. If this is the case, the driving device 20 can adapt its navigation in order to move the floor cleaning vehicle 20 to a newly designated area which is outside the feeding area FA and for example within the resting area RA. If the actual designated area is not within the feeding area FA, the floor cleaning vehicle 20 may continue its cleaning action within the actual designated area.

The embodiment as described above includes an unmanned autonomous feeding device. It should be noted that the claimed invention is not limited hereto and that the feed providing device need not be an unmanned vehicle, but may be a feed wagon operated by a user, or a feed pusher operated by a user. In such a configuration the first communication device may be provided in many different embodiments, such as a button in the stable, which when pushed will send the communication signal to the first autonomous vehicle. Or a mobile communication device, such as a mobile phone or smart phone, which is adapted to send the communication signal. Or the first communication device can be provided on the feeding device.

The invention claimed is:

1. A system configured to carry out a floor related action, the system comprising:
    an animal enclosure configured for detaining at least one animal and provided with an enclosure floor surface over which the at least one animal may move freely,
    a first vehicle configured to carry out the floor related action, wherein the first vehicle is configured to autonomously navigate along at least one planned route over the enclosure floor surface or is configured to autonomously navigate within at least one planned area of the enclosure floor surface, and
    a feed providing device configured to provide feed to the animal,
    wherein:
    the system comprises a first communication device configured to transmit a communication signal representative for an actual or planned feeding action of the feed providing device, the first vehicle comprises a second communication device configured to receive the communication signal representative for the actual or planned feeding action, and
    the first vehicle is configured to adapt the planned route or planned area on a basis of the communication signal representative for the actual or planned feeding action, and
    the enclosure floor surface is an area navigable by the at least one animal and by the first vehicle at the same time.

2. The system of claim 1, wherein the first vehicle is configured to clean the enclosure floor surface.

3. The system of claim 1, wherein the feed providing device is a feeding vehicle or feed pusher configured to provide feed next to or within the animal enclosure.

4. The system of claim 1, wherein the feed providing device is an unmanned device or vehicle.

5. The system of claim 1, wherein the enclosure floor surface comprises a feeding area where animals are fed by the feed providing device, wherein, when the communication signal indicates an actual or planned start of feeding of the animals, the first vehicle is configured to adapt the planned route or planned area to move to and/or within an area outside the feeding area.

6. The system of claim 5, wherein the enclosure floor surface further comprises a resting area, wherein, when the communication signal indicates an actual or planned start of feeding of the animals, the first vehicle is configured to adapt the planned route or planned area to move to and/or within the resting area.

7. The system of claim 6, wherein the first communication device and the second communication device each are wireless communication devices.

8. The system of claim 1, wherein the first communication device is provided on the feed providing device.

9. The system of claim 8, wherein the first communication device and the second communication device are Wi-Fi or Bluetooth devices.

10. The system of claim 1, wherein the feed providing device is not physically attached to the first vehicle.

11. The system of claim 1, wherein the first vehicle is configured to clean manure from the enclosure floor surface.

12. The system of claim 1, wherein the feed providing device is not physically attached to the first vehicle.

13. The system of claim 1, wherein the feed providing device is a second vehicle.

14. The system of claim 1, wherein the feed providing device is not configured to move on the enclosure floor surface.

15. The system of claim 1, further comprising a feed alley outside of and adjacent to the enclosure floor surface,
    wherein the enclosure floor surface is defined in part by a feed fence which prevents the at least one animal from leaving the animal enclosure and at the same time allows the at least one animal to move its head outside of the animal enclosure and eat food presented to the at least one animal in the feed alley by the feed providing device.

16. A method of carrying out at least a stable floor related action on a stable floor surface, the method comprising:
providing a first vehicle configured for carrying out the first stable floor related action, wherein the first vehicle is an unmanned vehicle configured to autonomously navigate along at least one planned route over the stable floor surface or is configured to autonomously navigate within at least one planned area of the stable floor surface, and
providing a feed providing device configured to provide feed to one or more animals,
transmitting, by a first communication device, a communication signal representative for an actual or planned feeding action of the feed providing device,
receiving the communication signal representative for the actual or planned feeding action by a second communication device provided on the first vehicle, and
adapting the planned route or planned area of the first vehicle on a basis of the communication signal representative for the actual or planned feeding action.

17. The method of claim 16, wherein the first stable or animal related action is cleaning of the stable floor.

18. The method of claim 16, wherein the feed providing device is configured to move over the stable floor surface.

19. The method of claim 16, wherein the stable floor surface comprises a feeding area where animals are fed by the feed providing device, wherein the method comprises:
transmitting the communication signal, whereby the communication signal indicates an actual or planned start of feeding of the animals, and
adapting by the first vehicle the planned route or planned area to move to and/or within an area outside the feeding area.

20. The method of claim 19, wherein the stable further comprises a resting area, wherein the method further comprises:
adapting by the first vehicle the planned route or planned area to move to and/or within the resting area.

21. The method of claim 16, wherein the feed providing device comprises the first communication device for transmitting the communication signal.

22. A system configured to carry out a floor related action, the system comprising:
an animal enclosure configured for detaining at least one animal and provided with an enclosure floor surface over which the at least one animal may move freely, a first vehicle that is a floor cleaning vehicle, wherein the first vehicle is configured to autonomously navigate along at least one planned route over the enclosure floor surface or is configured to autonomously navigate within at least one planned area of the enclosure floor surface, and
a second vehicle comprising a feed providing device configured to provide feed to the animal,
wherein:
the system comprises a first communication device configured to transmit a communication signal representative of an actual or planned feeding action of the feed providing device, the first vehicle comprises a second communication device configured to receive the communication signal representative of the actual or planned feeding action, and
the first vehicle is configured to adapt the planned route or planned area on a basis of the communication signal representative for the actual or planned feeding action,
the enclosure floor surface is an area navigable by the at least one animal and by the first vehicle at the same time, and
the at least one animal is a cow.

* * * * *